(12) United States Patent
Miyaki et al.

(10) Patent No.: US 8,981,605 B2
(45) Date of Patent: Mar. 17, 2015

(54) MOTOR DRIVE APPARATUS WITH SUBSTRATE FIXED, MEMBER AND ROTATION ANGLE SENSOR

(75) Inventors: Hiroyuki Miyaki, Obu (JP); Hiroyuki Kawata, Chiryu (JP); Yasuyoshi Toda, Toyohashi (JP)

(73) Assignee: Denso Corporation, Kariya (JP)

( * ) Notice: Subject to any disclaimer, the term of this patent is extended or adjusted under 35 U.S.C. 154(b) by 273 days.

(21) Appl. No.: 13/462,883

(22) Filed: May 3, 2012

(65) Prior Publication Data

US 2012/0286594 A1 Nov. 15, 2012

(30) Foreign Application Priority Data

May 13, 2011 (JP) ................. 2011-108804

(51) Int. Cl.
*H02K 11/04* (2006.01)
*H02K 11/00* (2006.01)
*H02K 29/08* (2006.01)

(52) U.S. Cl.
CPC ............ *H02K 11/0073* (2013.01); *H02K 29/08* (2013.01)
USPC ......................................... 310/71; 310/68 B

(58) Field of Classification Search
CPC .......... H02K 11/0015; H02K 11/0068; H02K 11/0073; H02K 11/0094; H02K 11/04
USPC .................................. 310/68 B, 71
See application file for complete search history.

(56) References Cited

U.S. PATENT DOCUMENTS

| 7,081,691 B2 | 7/2006 | Kawata | |
|---|---|---|---|
| 2003/0127921 A1* | 7/2003 | Akutsu et al. | 310/68 R |
| 2003/0200761 A1* | 10/2003 | Funahashi et al. | 62/228.4 |
| 2003/0206392 A1* | 11/2003 | Kawata | 361/631 |
| 2006/0075848 A1* | 4/2006 | Suzuki et al. | 74/606 R |
| 2008/0219867 A1 | 9/2008 | Sakata | |

FOREIGN PATENT DOCUMENTS

| JP | 04-033558 | 2/1992 |
|---|---|---|
| JP | 10-234158 | 9/1998 |
| JP | 11-195678 | 7/1999 |
| JP | 2006-261100 | 9/2006 |
| JP | 3-884450 | 2/2007 |
| JP | 4-252486 | 4/2009 |
| WO | WO 2008/126715 | 10/2008 |
| WO | WO 2010/007672 | 1/2010 |
| WO | WO 2010/150530 | 12/2010 |

OTHER PUBLICATIONS

Office Action (3 pages) dated Apr. 9, 2013, issued in corresponding Japanese Application No. 2011-108802 and English translation (4 pages).

(Continued)

*Primary Examiner* — Michael Andrews
(74) *Attorney, Agent, or Firm* — Nixon & Vanderhye P.C.

(57) ABSTRACT

An ECU attached to a motor assembly has a substrate and a heat sink. The substrate mounts thereon a microcomputer, which controls driving of a motor in accordance with a rotation angle of the motor. The substrate is fixed to the heat sink. The substrate has a first through hole group and a second through hole group, which are through holes connectable electrically by soldering to rotation angle signal wires connected to a rotation angle sensor, which detects a rotation angle of the motor.

9 Claims, 8 Drawing Sheets

(56) References Cited

OTHER PUBLICATIONS

Office Action (14 pages) dated Jan. 24, 2014, issued in copending U.S. Appl. No. 13/462,862 of Uchida, filed May 3, 2012.
Office Action (2 pages) dated May 14, 2013, issued in corresponding Japanese Application No. 2011-108804 and English translation (2 pages).
Final Office Action (7 pages) dated May 13, 2014, issued in copending U.S. Appl. No. 13/462,862 of Uchida, filed May 3, 2012.
U.S. Appl. No. 13/462,862 of Uchida, filed May 3, 2012.
U.S. Appl. No. 13/462,873 of Tsuboi, filed May 3, 2012.

\* cited by examiner

MOTOR DRIVE APPARATUS WITH SUBSTRATE FIXED, MEMBER AND ROTATION ANGLE SENSOR

CROSS REFERENCE TO RELATED APPLICATION

This application is based on and incorporates herein by reference Japanese patent application No. 2011-108804 filed on May 13, 2011.

TECHNICAL FIELD

The present disclosure relates to a motor drive apparatus, which drives a motor.

BACKGROUND

A conventional electric power steering system, which includes a motor and an electronic control unit (ECU) is disclosed in JP 2003-204654 A (JP 3593102, US 2003/0127921 A1). According to this electric power steering system disclosed, an ECU and a motor are integrated into one unit and a connector is used as for electrically connecting signal wires of a rotation angle sensor and the ECU.

The connector hinders size reduction of the system. Since parts cost of the connector is high, cost of the electric power steering system is necessarily high.

SUMMARY

It is therefore an objection to provide a motor drive apparatus, in which a connection part of signal wires of a rotation angle sensor and an ECU is sized small.

A motor drive apparatus according to one aspect comprises a substrate, a fixed member and a rotation angle sensor. The substrate mounts thereon a control circuit for controlling a motor in accordance with a rotation angle of the motor. The fixed member fixes the substrate. The rotation angle sensor detects a rotation angle of the motor. The substrate has a connection part group including a connection part, which is electrically connectable to a plurality of rotation angle signal wires connected to the rotation angle sensor by soldering or welding.

BRIEF DESCRIPTION OF THE DRAWINGS

The above and other objects, features and advantages will become more apparent from the following detailed description made with reference to the accompanying drawings. In the drawings.

DESCRIPTION OF EMBODIMENT (Embodiment)

A motor drive apparatus according to one embodiment is implemented in an electric power steering system, which assists a steering operation of a vehicle.

Figure 1:
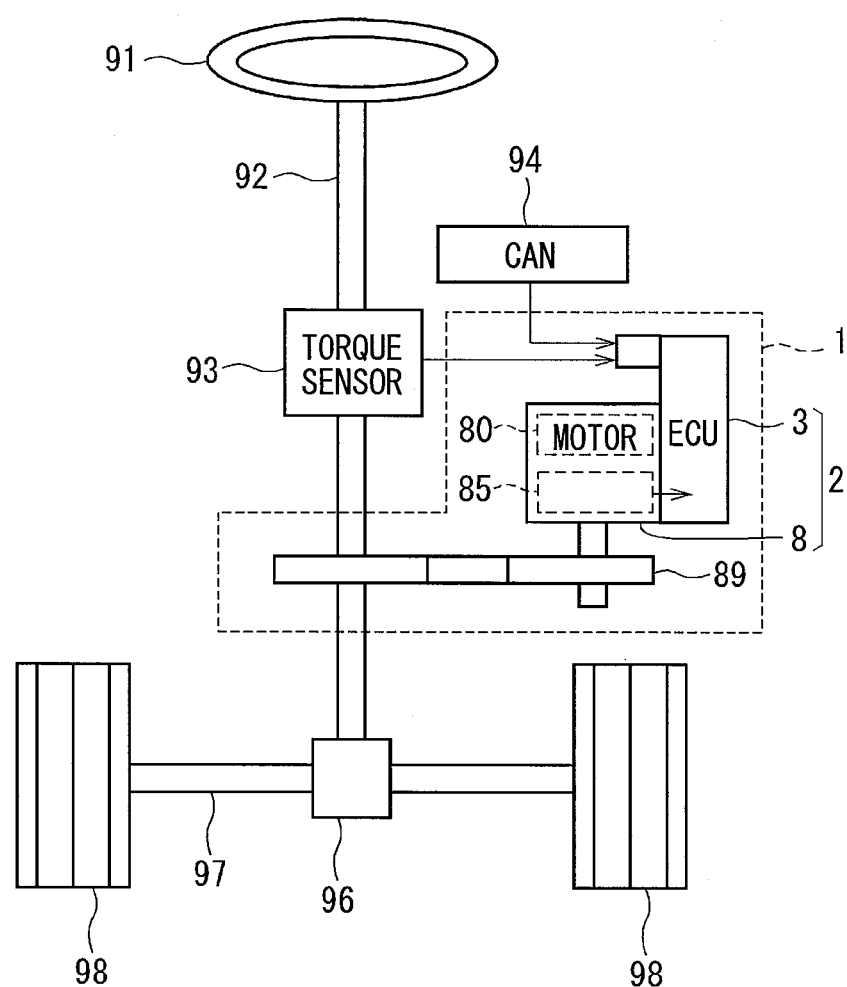
FIG. 1 is a schematic diagram of an electric power steering system, which implements a motor drive apparatus according to one embodiment.

As shown in FIG. 1, an electric power steering system 1 is provided in a power steering system to electrically assist a steering operation of a steering wheel 91. A torque sensor 93 is provided on a steering shaft 92 coupled to the steering wheel 91. The torque sensor 93 is for detecting a steering torque. A pinion gear 96 is provided at the top end of the steering shaft 92 and engaged with a rack shaft 97. A pair of tire wheels 98 is coupled rotatably to both ends of the rack shaft 97 through tie rods and the like. The rotary motion of the steering shaft 92 is converted to a linear motion of the rack shaft 97 by the pinion gear 96. The pair of tire wheels 98 is steered in correspondence to the linear motion of the rack shaft 97.

The electric power steering system 1 includes a motor unit 2 and a reduction gear 89. The motor unit 2 generates a steering assist torque. The reduction gear 89 reduces forward and reverse rotation of the motor unit 2 and transfers the rotation to the steering shaft 92. The electric power steering system 1 generates the steering assist torque and transfers the assist torque to the steering shaft 92 for assisting the steering of the steering wheel 91.

Figure 4:
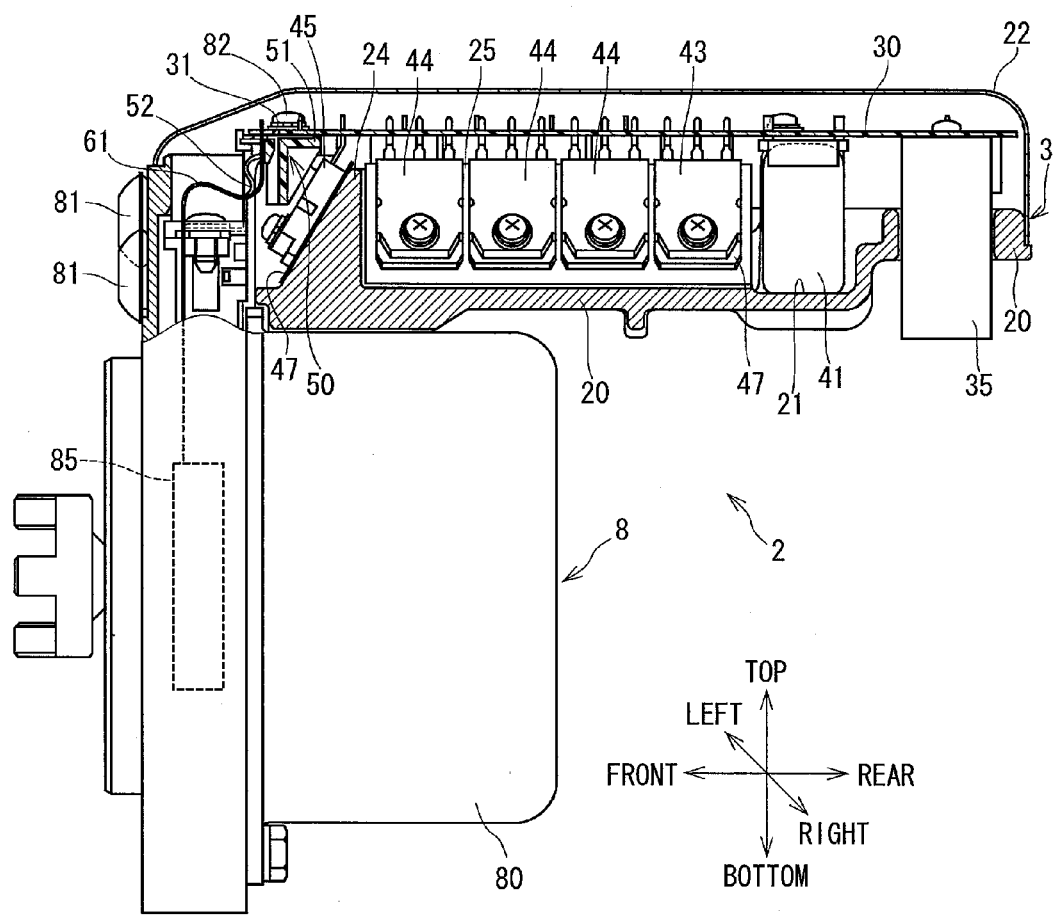
FIG. 4 is a sectional view of the motor drive apparatus shown in FIG. 1.

The motor unit 2 includes a motor assembly 8 and an electronic control unit (ECU) 3. The motor assembly 8 includes a motor 80 and a rotation angle sensor 85. The motor 80 is a three-phase brushless motor, which is formed of a stator, a rotor and the like. The stator is wound with coils. The rotor is rotatable in association with a rotating magnetic field generated by energization of the coils. The rotation angle sensor 85, which is for example a resolver, detects a rotation angle of the rotor. The rotation angle sensor 85 is electrically connected to the ECU 3 through four rotation angle signal wires 61 (FIG. 4). The signal wires 61 are arranged on the same plane and made of flexible flat wires.

The ECU 3 is inputted with a steering torque signal outputted from the torque sensor 93, a vehicle speed signal of a controller area network (CAN) and the like through a CAN interface circuit.

Figure 2:
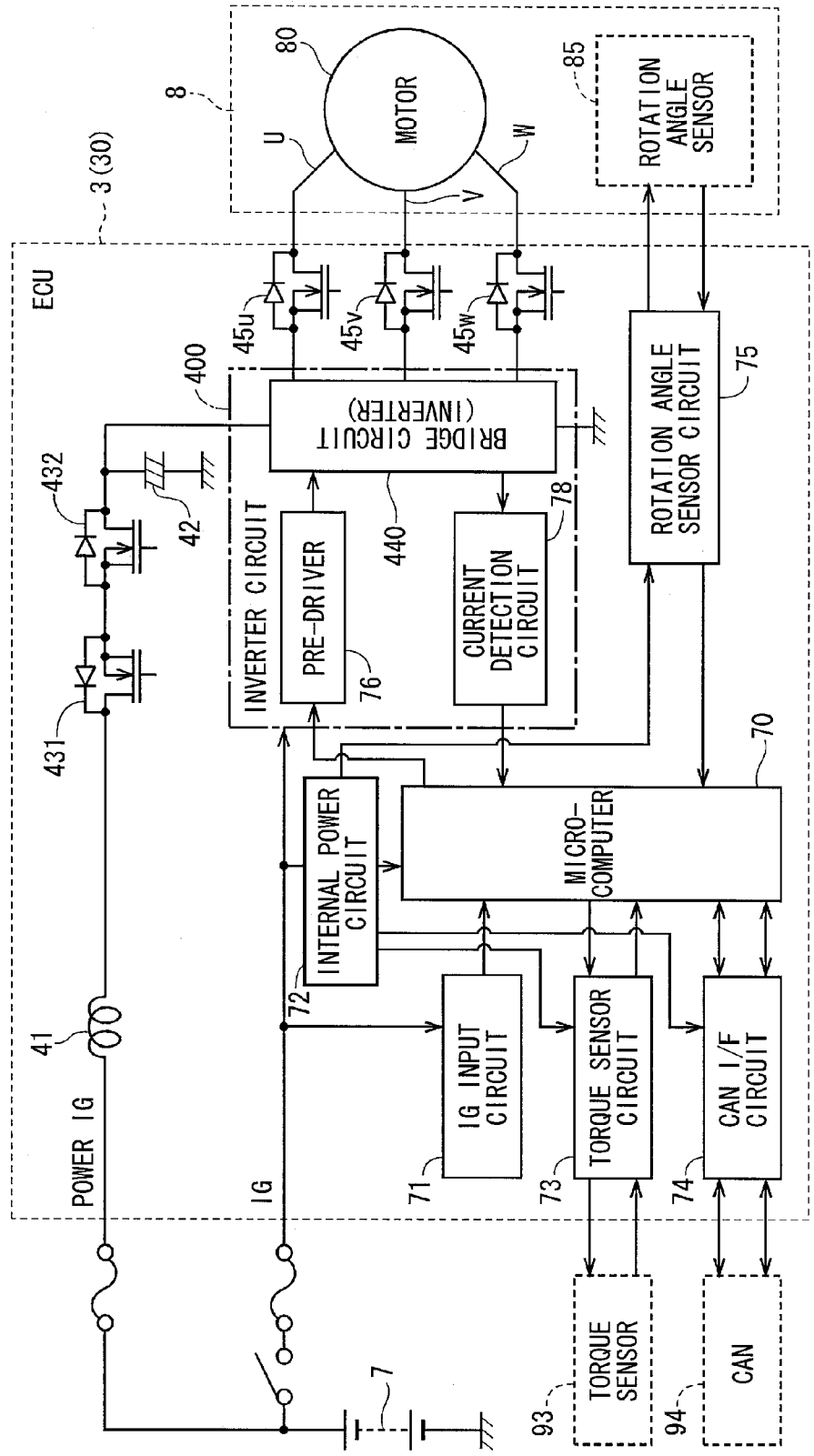
FIG. 2 is a circuit diagram of an ECU used in the embodiment.
Figure 3:
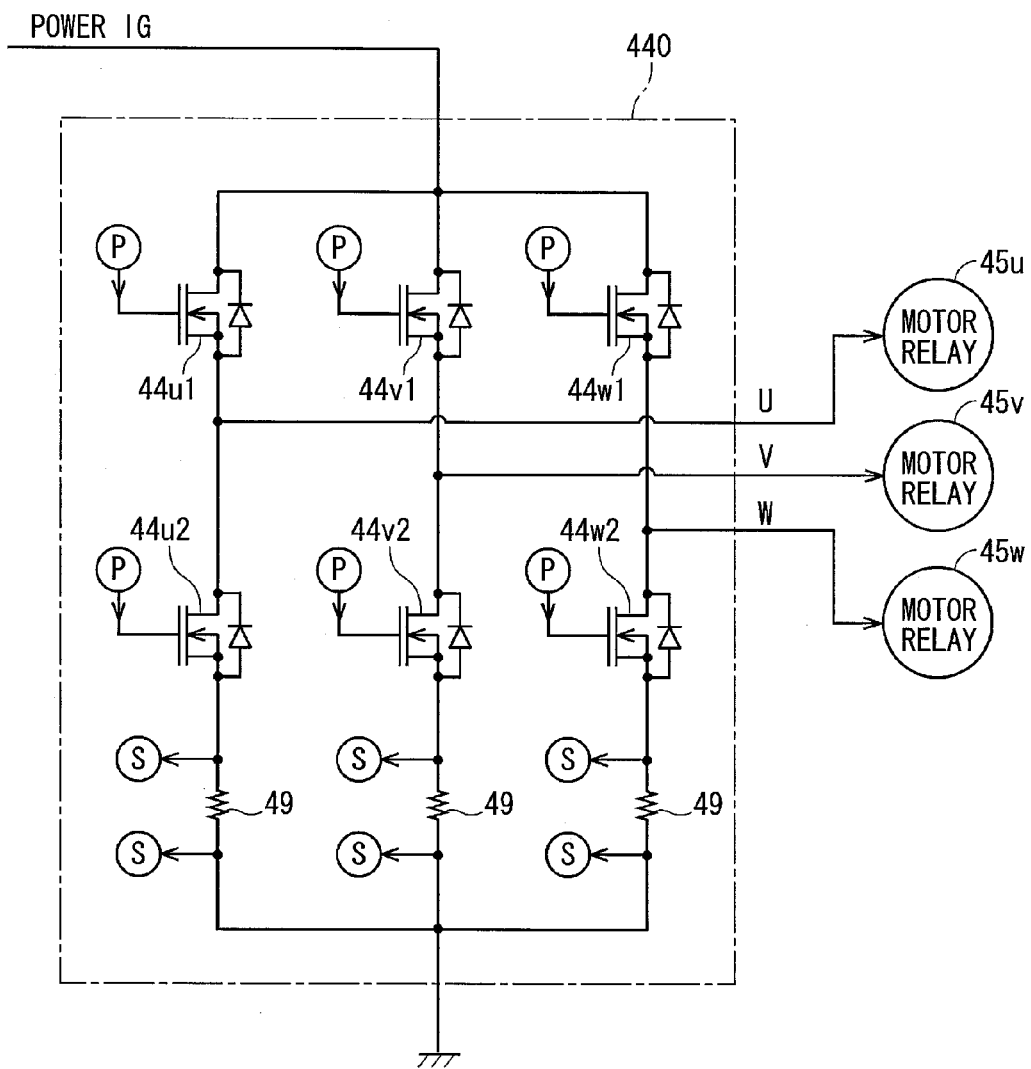
FIG. 3 is a circuit diagram of an inverter in the ECU shown in FIG. 2.

The ECU 3 is configured electrically as shown in FIG. 2 and FIG. 3. As shown in FIG. 2, the ECU 3 is supplied with an electric drive power and a control power from a battery 7 through a power IG bus and an IG bus, respectively.

The power IG bus is provided with a choke coil 41, an electrolytic capacitor 42 and metal-oxide-semiconductor filed-effect transistors (FETs) 431, 432 for power supply relays. The choke coil 41 and the electrolytic capacitor 42 form a filter circuit to reduce noises transferred from other devices, which share the battery 7, and noises transferred from the ECU 3 to other devices.

The FETs 431, 432 are connected such that respective parasitic diodes are biased in opposite directions. The two FETs 431, 432 are collectively referred to as a power relay FET 43. The FETs 431, 432 are turned off by commands from a microcomputer 70 to protect a bridge circuit (inverter) 440, when the ECU 3 fails, for example. The FETs 431, 432 also shut off a current, which flows from the bridge circuit 440 to the motor 80.

The control power flowing through the IG bus is supplied to an inverter circuit 400 and also to the microcomputer 70 through an IG input circuit 71 and an internal power circuit 72. The microcomputer 70 controls the inverter circuit 400 in accordance with various input signals related to the steering assist torque. For example, the steering torque signal outputted by the torque sensor 93 is inputted through a torque sensor circuit 73, and the vehicle speed signal of the CAN bus 94 is inputted through a CAN interface circuit 74. The rotation angle signal outputted by the rotation angle sensor 85 in the motor assembly 8 is inputted through a rotation angle sensor circuit 75.

The inverter circuit 400 includes, in addition to the bridge circuit 440 forming high-side and low-side arms of an inverter shown in FIG. 3, an inverter pre-driver 76 and a current detection circuit 78. In FIG. 3, "P" indicates a control signal from the inverter pre-driver 76 and "S" indicates an output signal to the current detection circuit 78.

As shown in FIG. 3, the bridge circuit 440 is formed of six FETs 44$u$1, 44$u$2, 44$v$1, 44$v$2, 44$w$1, 44$w$2 for an inverter and three shunt resistors 49. The FETs 44$u$1, 44$v$1, 44$w$1 are high-side arms, that is, high potential side switching elements, of the U-phase, the V-phase, the W-phase, respectively. The FETs 44$u$2, 44$v$2, 44$w$2 are low-side arms, that is, low potential side switching elements, of the U-phase, the V-phase, the W-phase, respectively. The three FETs for the high-side arms are referred to a FET 441, and the three FETs for the low-side arms are referred to as a FET 442. Further, the FETs 441, 442 for the high-side arm and the low-side arm are referred to as an inverter FET 44. The inverter FET 44 is a power element.

The inverter pre-driver 76 changes the gate voltages of the FETs 441, 442 in response to commands from the microcomputer 70 thereby to switch over on-off state between the source and the drain of the FETs 441, 442. Thus, a motor terminal voltage, which is a voltage developed at a junction between the source of the FET 441 and the drain of the FET 442, is controlled.

The shunt resistor 49 is connected electrically between the FET 442 of the low-side and the ground. The current detection circuit 78 detects a current flowing through the shunt resistor 49 thereby to detect a current supplied to the motor coil of each phase, and feeds back the detected current to the microcomputer 70.

FETs 45$u$, 45$v$, 45$w$ for motor relays are provided in a current supply path of each phase from the bridge circuit 440 to the motor 80 thereby to shut off the current supply to the motor 80 in case of failure and the like. The three motor relay FETs are collectively referred to as a motor relay FET 45.

The motor assembly 2 including the ECU 3 and the motor 8 is configured as shown in FIG. 4 to FIG. 8. The ECU 3 includes a heat sink 20, an electric circuit substrate 30 and a guide member 50, which is made of resin. The heat sink 20 is a fixed part. Here, for convenience of description, the upper side and the lower side in FIG. 4 are assumed to correspond to the top side and the bottom side of the ECU 3, respectively. Further, the left side and the right side in FIG. 4 are assumed to correspond to the front side and the rear side of the ECU 3, respectively. Still further, the front surface side and the rear surface side of FIG. 4 are assumed to be the right side and the left side of the ECU 3, respectively.

The heat sink 20 is formed of a heat conductive material such as a metal like aluminum, for example, and has a function of supporting the ECU 20 thereon and a function of absorbing heat generated by the FETs. The heat sink 20 is screw-threaded and fixed to the motor assembly 8 by fixing screws 81.

Figure 5:
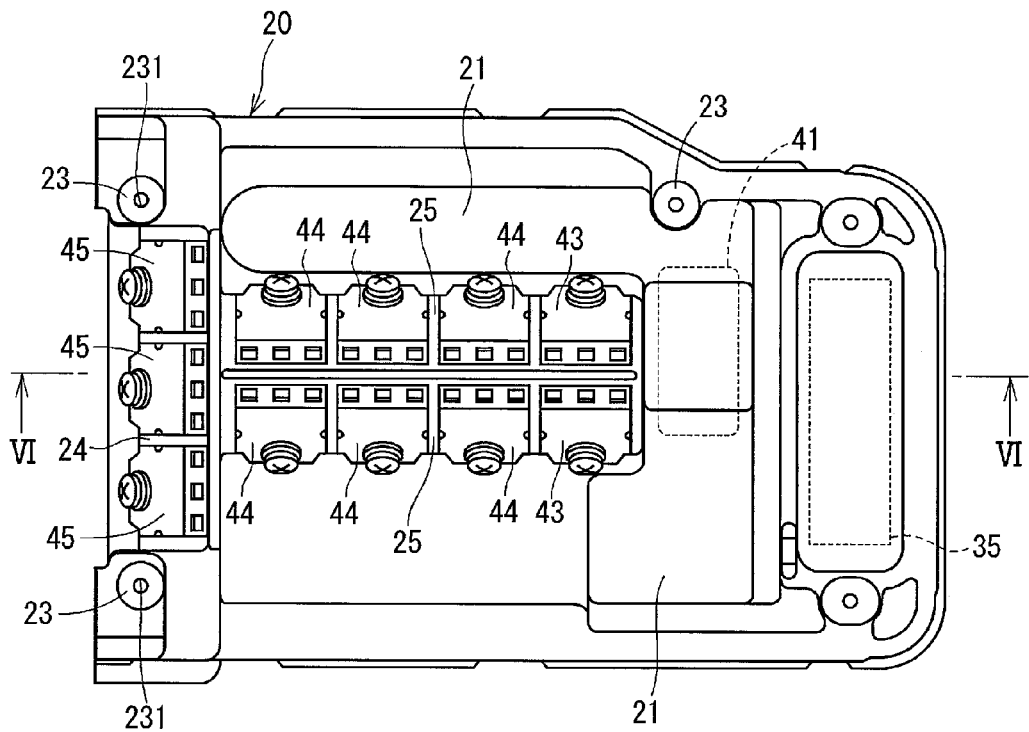
FIG. 5 is a top plan view of a heat sink used in the embodiment.

As shown in FIG. 5, the heat sink 20 has generally a rectangular shape when viewed from the top side. The heat sink 20 has a bottom part 21, which is formed generally in parallel to the substrate 30. A first mounting part 24 and a second mounting part 25, which protrude in the upward direction, are formed on the bottom part 21. The first mounting part 24 is formed to extend longitudinally in the left-right direction at the front side of the heat sink 20. The second mounting part 25 is formed to extend longitudinally in the front-rear direction at generally the left-right center of the heat sink 20. The FET 45 is mounted on a front inclined surface of the first mounting part 24 through an insulating and heat-radiating sheet 47. The inverter FET 44 and the power relay FET 43 are mounted on inclined surfaces at both left and right sides of the second mounting part 25 through the insulting and heat-radiating sheets 47.

The heat sink 20 has a plurality of protrusions 23 formed generally perpendicularly to the bottom part 21. A screw hole 231 is formed on the top surface of each protrusion 23 thereby to fix the substrate 30. That is, as indicated by a dotted line in FIG. 6, the substrate 30 is assembled to the top side of the heat sink 20. A cover 30 is provided at the opposite side of the heat sink 20 relative to the substrate 30.

Figure 6:
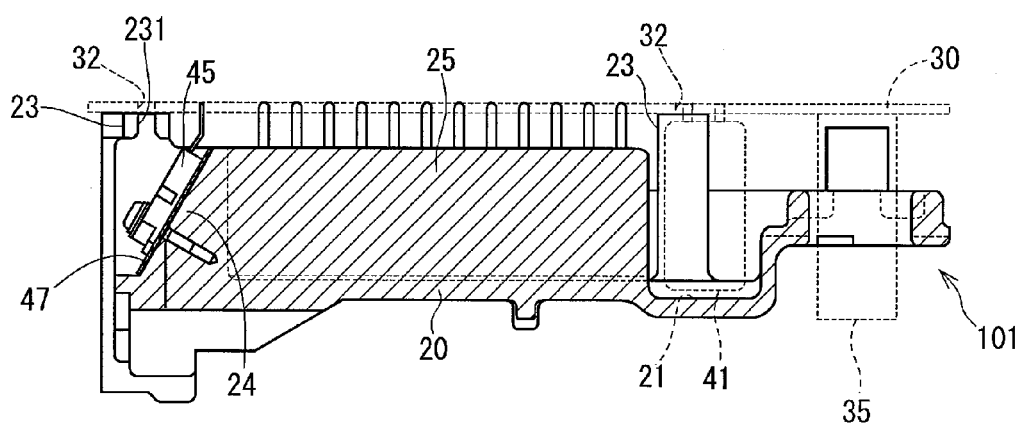
FIG. 6 is a sectional view taken along a line VI-VI in FIG. 5.
Figure 7:
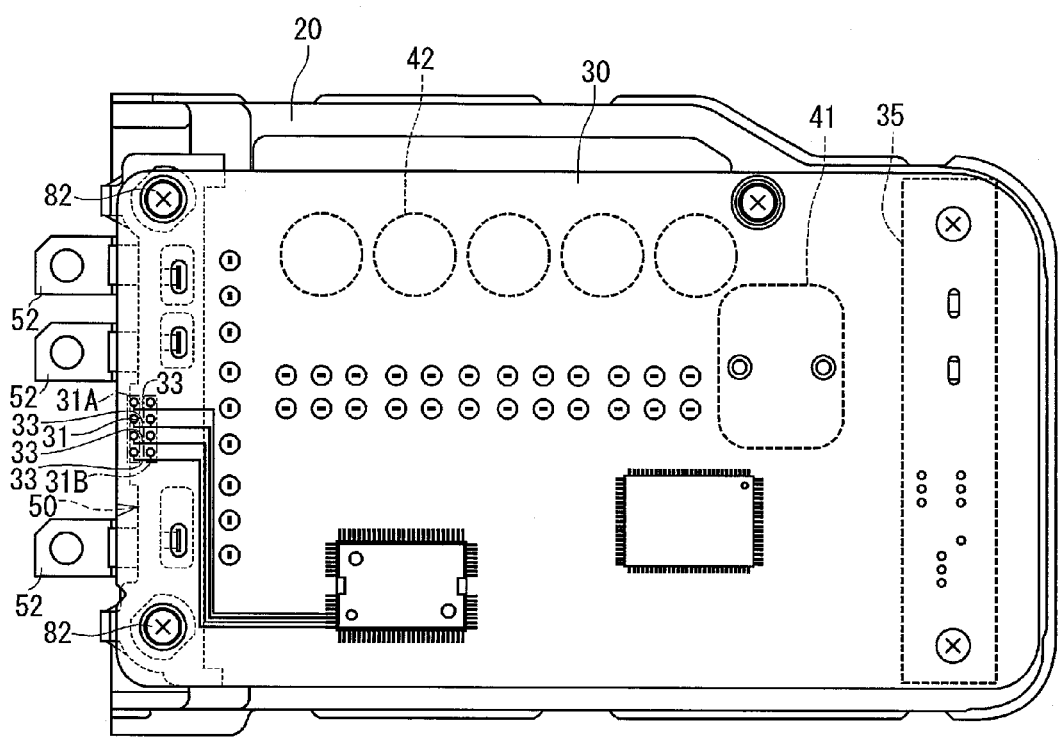
FIG. 7 is a top plan view of a substrate of the ECU in the embodiment.

The substrate 30 is provided above the heat sink 20 as shown in FIG. 4 to FIG. 6. The leads of the FETs 43, 44, 45 are electrically connected to the lower side of the substrate 30. The electrolytic capacitor 42, the choke coil 41 and a connector 35 are mounted on the lower side of the substrate 30 (FIG. 5 to FIG. 7). The microcomputer 70, which controls on-off states of the FETs 43, 44, 45, and the like are mounted on the substrate 30.

As shown in FIG. 7, eight through holes 31 are formed at the front intermediate part of the substrate 30 in the left-right direction. Each through hole 31 passes through the substrate 30 in the up-down direction. The through holes 31 form a connection part. The eight through holes 31 are divided into two rows formed in the front-rear direction. Four through holes 31 are arranged in the left-right direction in each row. The four through holes 31 of the front side form a first through hole group 31A, and the four through holes 31 of the rear side form a second through hole group 31B. The first through hole group 31A and the second through hole group 31B form connection part groups, respectively.

Each signal wire of the through hole group is taken out via a corresponding through hole separately and electrically connected to the microcomputer 70 and the like directly without passing through the other through holes of the through hole group. The through holes 31 of the first through hole group 31A and the through holes 31 of the second though hole group 31B are electrically connected via conductive wires 33, respectively. The wire 33 is formed of a fine land wire having heat insulating property.

Figure 8:
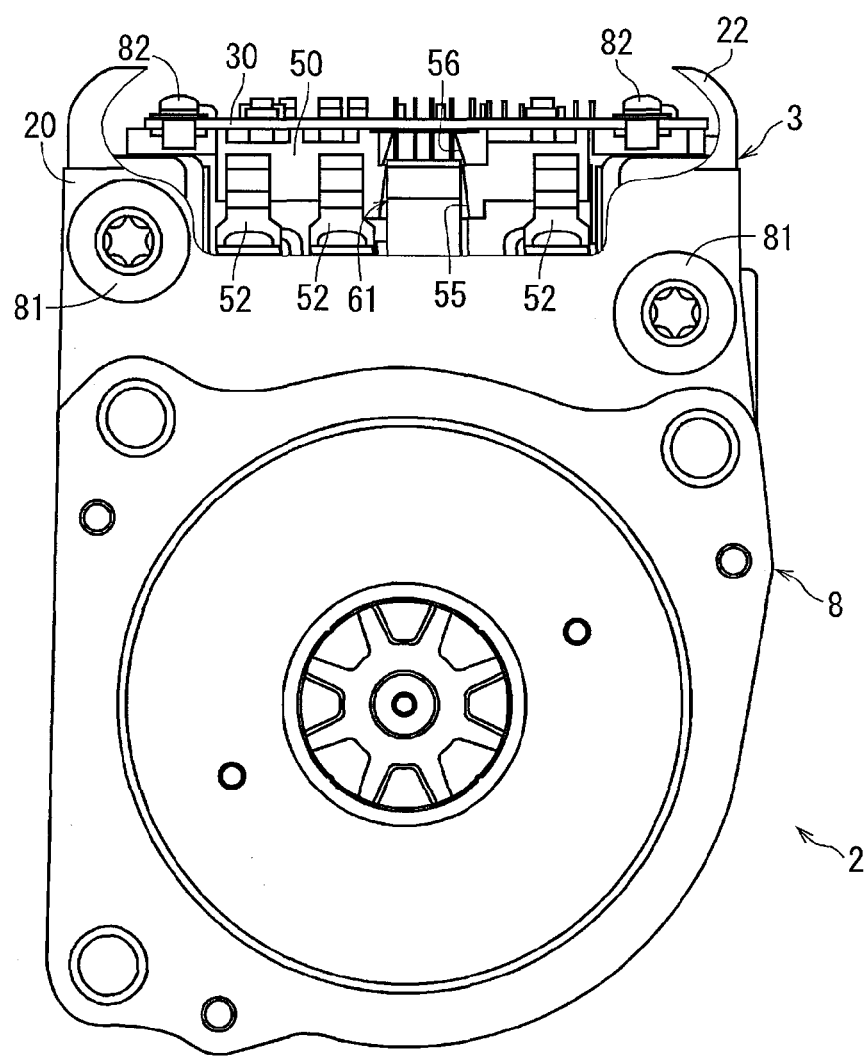
FIG. 8 is a front plan view of the motor drive apparatus shown in FIG. 4.

As shown in FIG. 8, the rotation angle signal wires 61 connected to the rotation angle sensor 85 are connected to the substrate 30 by soldering the same to the first through hole group 31A. A plurality of substrate holes 32 is formed in the substrate 30 thereby to fix the substrate 30 to the heat sink 20 (FIG. 6). The plurality of the substrate holes 32 is arranged to correspond in position to the screw holes 231 of the heat sink 20, respectively.

Figure 9:
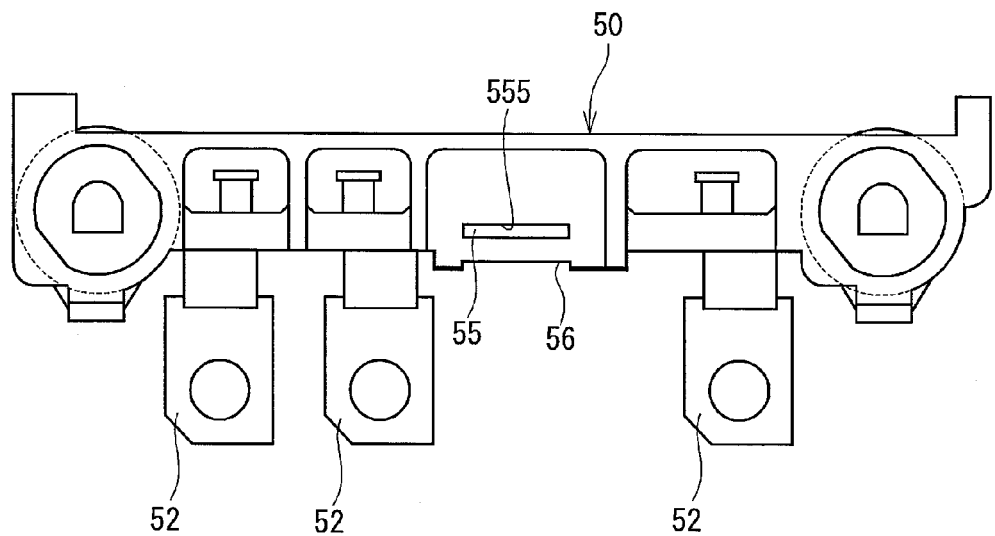
FIG. 9 is a top plan view of a guide member of the ECU in the embodiment.

As shown in FIG. 4, the guide member 50 is provided between the substrate 30 and the heat sink 20 and at the front side of the ECU 3. FIG. 9 shows a top plan view of the guide member 50 when viewed from the top side.

As shown in FIG. 9, the guide member 50 is formed in a generally rectangular shape and thee motor terminals 52 corresponding to the three-phases of the motor 80 are molded. The motor terminals 52 electrically connect the substrate 30 and the motor assembly 8.

Figure 10:
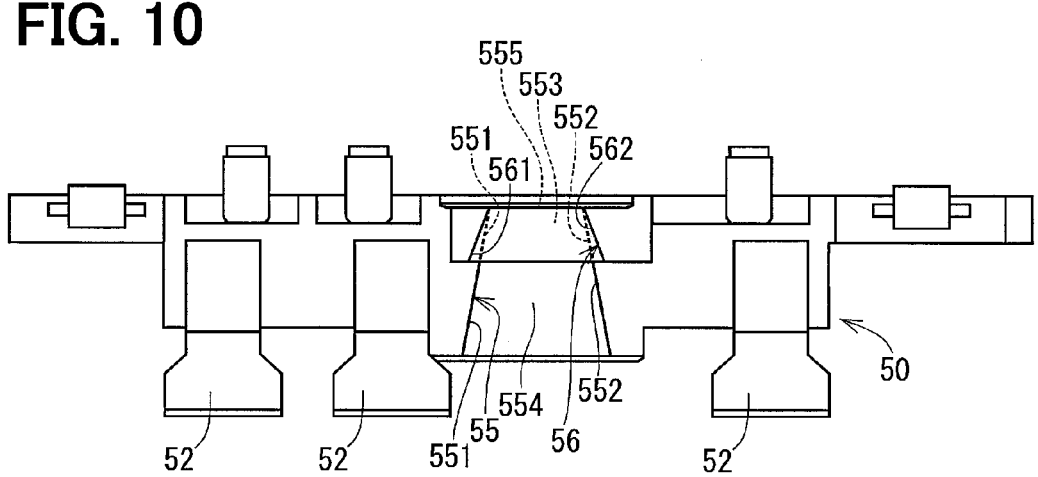
FIG. 10 is a front plan view of a guide member of the ECU in the embodiment.

A guide hole 55 is formed in the intermediate part of the guide member 50. The guide hole 55 is formed to pass through the guide member 50 in the up-down direction as shown in FIG. 8 and FIG. 10. The guide hole 55 has a first side wall 551 and a second side wall 552 formed in the up-down direction of the guide member 50. The first side wall 551 and the second side wall 552 are formed such that a left-right longitudinal distance therebetween decreases gradually from the bottom side to the top side.

The guide hole 55 has a top-side hole part 553 and a bottom-side groove 554. An upper opening 555 of the hole part 553 is formed to correspond in position to the second through hole group 31B of the substrate 30 (FIG. 4).

As shown in FIG. 9 and FIG. 10, a guide groove 56 is formed at the front side of the guide hole 55 of the guide member 50. The first side wall 561 and the second side wall 562 at the left side and the right side of the guide groove 56 are formed to have a left-right length therebetween, which gradually decreases from the bottom side to the top side. The guide hole 56 is formed to correspond in position to the first through hole group 31A of the substrate 30. The guide hole 55 and the guide groove 56 form a guide part.

The rotation angle signal wires 61 are guided along the guide groove 56 and inserted into the through holes 31 of the first through hole group 31A of the substrate 30. The rotation angle signal wires 61 are connected electrically to the lands of the substrate 30 by soldering.

An operation of the motor drive apparatus according to the embodiment will be described next.

The microcomputer 70 of the ECU 3 on-off controls the inverter MOS 44 via the inverter pre-driver 76 of the inverter circuit 400 based on the steering torque, the vehicle speed, the motor current detection signal and the motor rotation angle signal, which is transmitted from the rotation angle sensor 85 through the rotation angle signal wires 61. The inverter circuit 400 thus converts the DC power supplied from the battery 7 through the power relay MOS 43 into the three-phase AC power and supplies the same to the motor 80 of the motor assembly 8 through the motor terminals 52. The rotation output power of the motor assembly 8 is transferred to the steering shaft 92 through the reduction gear 89 and assists a steering operation of a driver.

The ECU 3 of the embodiment provides the following advantages (1) to (6).

(1) The rotation angle signal wires 61 are connected to the substrate 30 electrically by soldering to the through holes 31 of the substrate 30. Thus a conventional large-sized connector is not necessitated and the ECU 3 is reduced in size. By eliminating a connector, which costs high, a product cost is reduced. The motor 80 or the ECU 3 may be replaced simply by removing the solder and soldering again at the through hole group 33.

(2) In case that the motor assembly 8 has a failure, the rotation angle signal wires 61 need be removed and then connected again to reassemble the motor assembly 8. When the rotation angle signal wires 61 are removed from and soldered again to the substrate 30, the connection part of the substrate 30 is repetitively heated. This repetitive heating causes damages such as peeling of lands and loss of copper loss, and reliability of electric connection is not ensured.

According to the embodiment, however, the first through hole group 31A and the second through hole group 31b are formed in the substrate 30. In case that the motor assembly 8 is reassembled, the rotation angle signal wires 61 are disconnected from the first through hole group 31A for some time. Then the rotation angle signal wires 61 can be soldered to the second through hole group 31B, which were not used previously, in case that the rotation angle signal wires 61 and the substrate 30 are connected again. Thus, when the rotation angle signal wires 61 and the substrate 30 are connected again, the rotation angle signal wires 61 need not be connected to the first through hole group 31A, which is damaged by heating of the substrate 30. As a result, a solder part, at which the rotation angle signal wires 61 and the substrate 30 are connected again, is protected from weakening of strength and insufficiency of connection.

(3) The guide groove 56 is formed in the guide member 59 provided between the substrate 30 and the heat sink 20. In case of assembling, the rotation angle signal wires 61 are guided to the first through hole group 31A by the guide groove 56. Since the rotation angle signal wires 61 are flexible flat wires, the rotation angle signal wires 61 can be guided to the first through hole group 31A along the guide part. The rotation angle signal wires 61 and the substrate 30 can be connected readily and assembling work can be improved.

(4) The guide hole 55 is formed further in the guide member 50 provided between the substrate 30 and the heat sink 20. Thus, when the rotation angle signal wires 61 and the substrate 30 are connected again for example, the rotation angle signal wires 61 are guided to the guide hole 55, which corresponds in position to the second through hole group 31B, which was not in use previously. The reassembling work can thus be improved.

(5) The through holes 31 of the first through hole group 31A and the through holes 31 of the second through hole group 31B are connected electrically via fine wires, which are heat-insulating. Thus, when the rotation angle signal wires 61 are disconnected from the substrate 30 by removing the solder of the first through hole group 31A, the second through hole group 31B, which is not in use, is not damaged even when the first through hole group 31A is damaged, for example peeling-off of lands, by heat. The reliability of the electric connection of the second through hole group 31B is not lowered. The order of the through hole groups used for the first soldering and the second soldering may be exchanged.

(6) Each through hole of the through hole group allows the wire to be taken out independently of the other through holes and are connected electrically to the microcomputer 70 and the like without passing through the other through holes of the through hole group. In case that the rotation angle signal wires 61 are pulled out of the substrate 30 by removing the solder of the first through hole group 31A to reassemble the motor assembly 8, the lands of the first through hole group 31A are likely to be peeled off because of heating. Even in this case, the electric connection between the second through hole group 31B and the wires 33 is not affected. In case that the rotation angle signal wires 61 are connected to the second through hole group 31B, the electric connection between the rotation angle signal wires 61 and the microcomputer 70 and the like can be ensured. It is possible to reverse the order of use of the through hole groups which are soldered.

Other Embodiments

The present embodiment may be modified as follows as other embodiments.

The rotation angle sensor may be a Hall element or the like. The motor drive apparatus, that is, the ECU, may be applied to motors for other systems than the electric power steering system.

The through holes formed in the substrate may be other than eight in number. The through hole groups may be formed of through holes, which are arranged in the front-rear direction instead of the arrangement in the left-right direction. Three or more guide parts may be formed.

The rotation angle signal wires may be connected electrically to the substrate by welding instead of soldering. The rotation angle signal wires may be other wiring members such as a wire harness than the flexible flat wires. The rotation angle signal wires and the lands of the substrate may be connected directly without through holes.

The guide member may be formed of ceramic or the like instead of resin.

The embodiment may further be modified without departing from the spirit of the disclosure.

What is claimed is:

1. A motor drive apparatus for connection to a motor comprising:
   a substrate mounting thereon a control circuit for controlling the motor in accordance with a rotation angle of the motor and having a connection part group, which includes a connection part electrically connectable to a plurality of rotation angle signal wires connected to a rotation angle sensor for detecting the rotation angle of the motor by soldering or welding;
   a fixed member for fixing the substrate; and
   a guide member provided between the substrate and the fixed member and having a motor terminal and a guide part, the motor terminal being electrically connected to the motor and molded, the guide part guiding the rotation angle signal wires to the connection part group and being formed in an intermediate part, and the guide part being located between the substrate and the fixed member in a guiding direction of the plurality of rotation angle signal wires for connection and disconnection to and from the connection part of the substrate, respectively;
   wherein the rotation angle signal wire is a flexible flat wire, and the guide part has a guide hole and a guide groove.

2. The motor drive apparatus according to claim 1, wherein:
   the substrate has two or more connection groups in number.

3. The motor drive apparatus according to claim 1, wherein:
   the guide member has a same number of guide parts as the number of the connection part groups.

4. The motor drive apparatus according to claim 1, wherein:
   the connection part is a through hole and the connection part group is a through hole group of a plurality of through holes.

5. The motor drive apparatus according to claim 4, wherein:
   each of the through holes of the through hole group is configured to allow the rotation angle signal wires to be passed through independently and heat-insulated one another.

6. The motor drive apparatus according to claim 4, wherein:
   the through holes of connection part groups are electrically connected to each other, respectively, so that any one of the connection part groups is selected to be connected to the rotation angle signal wires.

7. The motor drive apparatus according to claim 1, wherein the control circuit includes electronic components provided between the substrate and the fixed member.

8. The motor drive apparatus according to claim 1, wherein the connection part group is provided at one side end of the substrate;
   the guide member extends along the one side end of the substrate; and
   the guide part is provided at the intermediate part of the guide member.

9. A motor drive apparatus for connection to a motor comprising:
   a substrate mounting thereon a control circuit for controlling the motor in accordance with a rotation angle of the motor and having a connection part group, which includes a connection part electrically connectable to a plurality of rotation angle signal wires connected to a rotation angle sensor for detecting the rotation angle of the motor by soldering or welding;
   a fixed member for fixing the substrate; and
   a guide member provided between the substrate and the fixed member and having a motor terminal and a guide part, the motor terminal being electrically connected to the motor and molded, and the guide part guiding the rotation angle signal wires to the connection part group and being formed in an intermediate part;
   wherein the rotation angle signal wire is a flexible flat wire, and the guide part has a guide hole and a guide groove;
   the connection part group is provided at one side end of the substrate;
   the guide member extends along the one side end of the substrate; and
   the guide part is provided at the intermediate part of the guide member.

* * * * *